3,497,479
CURABLE POLYAMIDES FROM DIMETHYL MUCONIC ACID ISOMERS

Richard D. Cassar, West Chester, Pa., assignor to Sun Oil Company, Philadelphia, Pa., a corporation of New Jersey
No Drawing. Filed July 29, 1966, Ser. No. 568,773
Int. Cl. C08g 20/20
U.S. Cl. 260—78                                    12 Claims

ABSTRACT OF THE DISCLOSURE

Curable polyamides having high melting points and suitable for the formation of yarns and fibers as well as for films and coating can be prepared from the isomers of dimethylmuconic acid either singularly or in a mixture with each other. The polymers may also contain moieties derived from dibasic acids containing no ethylenic unsaturation, such as, adipic acid.

BACKGROUND OF THE INVENTION

There are three geometric isomers of $\alpha,\alpha'$-dimethylmuconic acid.

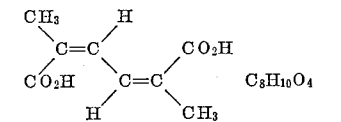

$\alpha,\alpha'$-dimethyl-cis,cis-muconic acid

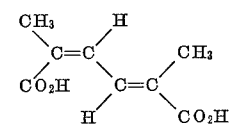

$\alpha,\alpha'$-dimethyl-cis,trans-muconic acid

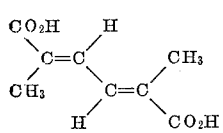

$\alpha,\alpha'$-dimethyl-trans,trans-muconic acid

These isomers are known in the art and the method for their production is shown in Elvidge et al., Journal Chemical Society, 1952, pp. 1026–33. The method employed was the peracetic acid oxidation of p-xylenol to produce the cis,cis isomer. The cis,cis isomer is inverted by boiling alkali to the trans,trans isomer. The cis,trans acid was produced by treatment with methanolic sodium methoxide.

An alternative method for producing the $\alpha,\alpha'$-dimethyl-cis,cis-muconic acid is disclosed in U.S. Patent 3,383,289, issued May 14, 1968 to Raymond et al., which discloses a micro-biological oxidation of alkyl benzenes. The cis,cis isomer is produced by a particular strain of micro-organisms of genus Nocardia, more particularly Nocardia coralline, a culture of which has been deposited with the American Type Culture Collection, Washington, D.C., under the number ATCC 19,070. This isomer can readily be isomerized to the cis,trans isomer or the trans,trans isomer under appropriate isomerization conditions.

The three isomeric dimethylmuconic acids are white crystalline powders with the following physical properties:

TABLE I

|  | Cis,cis | Cis,trans | Trans,trans |
|---|---|---|---|
| Molecular Wt. | 170.2 | 170.2 | 170.2 |
| Melting Pt. °C. | [1] 223–224 | [1] 179–180 | 332–333 |
| Ionization constants (at 25°C.): | | | |
| $pK_1$ | 3.37 | 3.65 | |
| $pK_2$ | 4.73 | 5.20 | |
| Solubility, g./100 g. solution, 25.0°C., water | 0.026 | 0.244 | 0.0036 |
| Water | [2] 0.24 | [2] 1.97 | [2] 0.032 |
| Ethyl alcohol | 3.30 | 22.7 | 0.39 |
| Ethyl acetate | 0.185 | 2.17 | 0.028 |
| Acetone | 0.994 | 7.60 | 0.112 |
| Benzene | 0.006 | 0.023 | 0.008 |
| Spectra: U.V., Visible max. (CH$_3$OH) | 273 | 278 | 282 |

[1] M.P. varies with the rate of heating.
[2] At 80° C.

DESCRIPTION OF THE INVENTION

The present invention relates to novel linear polyamides comprising an organic diacid component selected from the group consisting of $\alpha,\alpha'$-dimethyl-cis,cis-muconic acid, $\alpha,\alpha'$-dimethyl-cis,trans-muconic acid, $\alpha,\alpha'$-dimethyltrans,trans-muconic acid and mixtues thereof with each other and with a saturated organic diacid of the structure

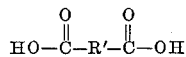

where R' is a bivalent organic and an organic diamine of the structure $H_2N-R''-NH_2$ where R'' is a bivalent organic radical.

Polyamides have been of commercial importance for about 30 years and literally thousands of polyamides have been described in the art. The present polyamides, however, are unique in having unsaturated positions available for crosslinking. Previously, it has been possible to produce polyamides with unsaturation present in the acid portion thereof, for example, by using maleic or fumaric acid. However, the present polyamides need contain only one half the molar concentration of unsaturated acid as a polyamide from maleic or fumaric acid in order to have the same number of crosslinking sites. This is a substantial advantage where, for example, it is desirable to use less costly acids such as adipic acid in conjunction with the unsaturated acid.

From the other point of view the present polyamides will contain twice the available crosslinking sites as a polyamide containing the same molar percent of maleic or fumaric acid. This is, of course, desirable since in any curing not all of the sites available for crosslinking will in fact crosslink. Thus, the instant polyamides will produce a greater degree of crosslinking than was previously possible for any particular molar concentration of monounsaturated diacid therein.

The present polyamides are soluble in the usually polyamide solvents, e.g., phenols, formic acid, chloral hydrate, mineral acids and the like. The polyamides can be dry-spun from formic acid for example to produce cord or fibers which can be used in the usual manner for reinforcing or producing synthetic textiles, carpet piles and the like. More particularly, the cord can be employed in tire construction in much the same manner as nylon or rayon tire cord but with the important advantage that the cord is crosslinked with the rubber during curing to provide greater tire strength. Sheets and films can be cast from solvent solution. Such films have good clarity and can be crosslinked to form a thermoplastic film or adhered to another crosslinkable material. Wet-spinning of the polyamides from a phenolic solution into an alkaline bath can also be employed.

Solution and melt polymerizations have been employed to produce the polyamides of the invention. Interfacial polymerization is preferred because it can be carried out at room temperature in relatively simple equipment, the polyamides produced therein have a greater degree of crystallinity than those from single solvent systems and melt polymerization. The $\alpha,\alpha'$-dimethylmuconyl chloride is preferably employed in the interfacial polymerization because of its excellent solubility in the carbon tetrachloride solvent. However, the diacid or diester thereof can be employed by use of higher temperatures or selection of the proper solvent.

The saturated organic diacid is characterized by the formula

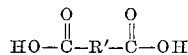

wherein R', the bivalent radical can be selected from the following groups: aromatic, aliphatic, cycloaliphatic, combination of aromatic and aliphatic, heterocyclic, bridged organic radicals wherein the bridge is oxygen, nitrogen or sulfur and substituted groups thereof. Such substituents include halogen, amino, hydroxy, methoxy, sulfide and the like provided said substituents do not interfere with the polymerization. The preferred R' group is a radical having 1 to 20 carbon atoms selected from the group consisting of alkylene, cycloalkylene and arylene.

As indicated above, the $\alpha,\alpha'$-dimethylmuconic acid can be employed in admixture with a saturated organic diacid,

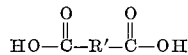

wherein R' has the significance previously given. When a saturated organic diacid is employed the mole ratio of dimethylmuconic acid to saturated diacid is generally in the range of 1:100 to 100:1 preferably 1:20 to 20:1. The selection of a particular diacid and the mole ratio to be employed will depend on the desired properties of the final polyamide. For example, if a curable polyamide having properties very similar to nylon 66 is desired, then the saturated organic diacid employed is adipic acid and the mole ratio of dimethylmuconic acid to adipic acid would be 1:10 or more.

In addition to adipic acid some suitable saturated organic diacids or derivatives thereof as described that can be used in conjunction with $\alpha,\alpha'$-dimethylmuconic acid in the polymerization are:

oxalic;
adipic;
pimelic;
suberic;
azelaic;
sebacic;
undecanedioic;
dodecanedioic;
octadecanedioic;
tetradecanedioic;
malonic;
succinic;
glutaric;
cyclopentane dicarboxylic;
cyclohexane dicarboxylic;
decalin dicarboxylic;
orthophthalic;
isophthalic;
terephthalic;
diphenic;
1,2,2-trimethyl-1,3-cyclopentane dicarboxylic;
bromopropanedioic;
3-methyl-1,1-butanedicarboxylic;
mesoxalic;
4,6-dimethylisophthalic;
l-glutamic;
2,6-naphthalene dicarboxylic;
o,o'-azobenzene-dicarboxylic;
p,p'-azobenzenedicarboxylic;
o,o'-azoxydibenzoic;
p,p'-benzophenone dicarboxylic;
2,3-dihydroterephthalic;
1-3,3'-dithiobis (2-amino-propanoic);
2,5-furandicarboxylic;
oxydiethanoic;
3,5-pyridinedicarboxylic;
$\alpha$-2-toluenedicarboxylic;
$\alpha$-hydroxy-isosuccinic;
4-hydroxy-isophthalic;
tetrachloro phthalic;
quinolinic;
$\alpha$-amino-succinic;
tartronic;
benzyl-tartronic;
2,3-thiophene-dicarboxylic;
isohemipinic and the like.

A more preferred saturated organic diacid is one selected from the group consisting of oxalic, adipic, pimelic suberic, azelaic, malonic and glutaric acid.

The organic diamines are characterized by the formula $H_2N-R'-NH_2$ wherein R'', the divalent radical, can be selected from the following groups: aromatic, aliphatic, cycloaliphatic, combination of aromatic and aliphatic, heterocyclic, bridged organic radicals wherein the bridge is oxygen, nitrogen, sulfur silicone or phosphorous, and substituted groups thereof. Such substituents include ether, sulfide, ketone, amide, halogen and the like wherein the substituent does not interfere in the polymerization. The preferred R'' group is a radical having 2 to 20 carbon atoms selected from the group consisting of alkylene, cycloalkylene and arylene. More preferably R'' is an alkylene radical having 2 to 12 carbon atoms. Among the diamines which are suitable for use in the present invention are:

ethylenediamine;
propylenediamine;
tetramethylenediamine;
pentamethylenediamine;
hexamethylenediamine;
heptamethylenediamine;
octamethylenediamine;
nonamethylenediamine;
decamethylenediamine;
3-methylhexamethylenediamine;
3-methylheptamethylenediamine;
4,4-dimethylheptamethylenediamine;
2,11-diaminododecane;
1,12-diamino-octadecane;
2,2-dimethylpropylenediamine;
2,5-dimethylhexamethylenediamine;
3,3-diaminodipropyl ether;
triglycoldiamine;
3,3'-diaminodipropylamine;
1,2-bis-(3-amino-propoxy) ethane;
3-methoxy-hexamethylenediamine;
3,3'-diaminodipropyl sulfide;
1,4-diaminocyclohexane;
p-menthane-1,8-diamine;
bis (para-aminocyclohexyl) methane;
meta-phenylenediamine;

para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamine-pyridine;
bis-(4-amino-phenyl) diethyl silane;
bis-(4-amino-phenyl) phosphine oxide;
bis-(4-aminophenyl)-N-methylamine;
1,5-diamino-naphthalene;
3,3'-dimethyl-4,4'-diamino-biphenyl;
3,3'-dimethoxy benzidine;
2,4-bis-(beta-amino-t-butyl) toluene;
bis-(para-beta-amino-t-butyl-phenyl) ether;
para-bis-(2-methyl-4-amino-pentyl)benzene;
para-bis-(1,1-dimethyl-5-amino-pentyl)benzene;
m-xylylene diamine;
p-xylylene diamine and the like.

Generally a stoichiometric ratio of diacid component to organic diamines will be employed, although it is sometimes desirable to use a slight excess of the diamine.

As previously indicated, an interfacial polymerization is preferably employed to produce the polyamide of the invention. The acid reactants are preferably employed in the diacyl chloride form. Suitable solvents for polymerization include carbon tetrachloride, ethanol, benzene, hexane, cyclohexane, petroleum ether and the like. Most preferably the solvent should be one in which the acid reactants are soluble at room temperature, although reaction temperatures of 20 to 100° C. can be employed. The diamines suitable for the present invention are generally soluble in polar solvents. Suitable solvents include water, ethanol, acetone, ethyl ether and the like.

Usually in the solvents employed in the polymerizations will not dissolve any substantial portion of the polyamide product. Such a system results in a precipitation of the polyamide which can be easily recovered from the reaction mixture. It is, however, entirely permissible to use a solvent in which the polyamide is soluble since fiber or film could be produced directly therefrom.

The polyamides of the present invention have inherent viscosities in the range of .05 to 2.0. The inherent viscosity ($\eta_{inh}$) is indicative of the degree of polymerization and is used herein as a measure thereof. Inherent viscosity is represented by the equation:

$$\eta \text{ inherent} = \ln \frac{\eta \text{ relative}}{C}$$

where:

$\eta$ relative $= t/t_0$.
$t_0 =$ flow time through a viscometer of a liquid reference.
$t =$ flow time through the same viscometer of a dilute solution of polymer in the reference liquid.
$C =$ concentration of polymer in solution expressed in grams/deciliter.

The polyamides of the present invention can be crosslinked with themselves or with a suitable crosslinking agent. Suitable crosslinking agents include styrene, butadiene, methyl methacrylate, vinylacetate, acrylonitrile, vinylidene chloride, isoprene, natural rubber, butyl rubber and the like. Either conventional hot or cold curing procedures can be used.

The polyamides are crosslinked with the cross-linking agent by dissolving the polyamides in the crosslinking agents, generally by heating to a temperature of 40 to 100° C. or by placing the polyamide in immediate contact with the crosslinking agent.

A free radical catalyst is preferably employed in the curing thus allowing lower curing temperatures. Suitable catalysts include the peroxides such as benzoyl peroxide or azo-bis-isobutyronitrite for hot cures and methyl ethyl ketone peroxide in dimethyl phthalate and 1% cobalt naphthenate in a styrene for cold cures. Hot cures can be conducted at a temperature in the range of 50 to 150° C. for .5 to 10 hours and cold cures at a temperature of 20 to 50° C. for .5 to 10 hours.

In addition to catalysts, promoters or accelerators such as N,N-dimethylaniline can be employed during curing. Prior to curing fillers such as glass wool and asbestos, carbon, color pigments and the like can be added.

The acyl dichlorides and dialkyl esters of the $\alpha,\alpha'$-dimethylmuconic acid can be prepared by conventional procedures known in the art. For example, the acyl dichloride is prepared by reacting two moles of oxalyl chloride with one mole of the $\alpha,\alpha'$-dimethylmuconic acid in a benzene solvent at room temperature and recrystallizing the $\alpha,\alpha'$-dimethylmuconyl chloride from hexane.

The following illustration is typical of the reactions in the examples and should serve as a guide to the polyamides obtained in each and to those within the scope of the invention generally. The reaction in the illustration involves $\alpha,\alpha'$-dimethyl-trans,trans-muconyl chloride and hexamethylenediamine.

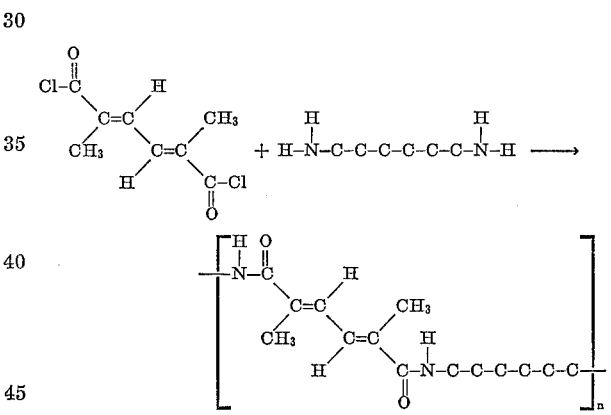

When an unsaturated organic diacid is used in addition to the dimethylmuconic acid, the polyamide will contain a proportionate amount of such saturated organic diacid in the polymer chain.

The presence of the polyamides, in the final reaction product was determined from X-ray diffraction patterns and infra-red spectrum.

The examples presented herein are intended to be merely illustrative and are not intended to limit the scope of the claims. Certain ratios of reactants have been specified. It is to be understood that those of skill in the art will be able to select the respective proportion from each range so as to produce compositions within the spirit and scope of the invention as disclosed. The examples provide guidelines to indicate to those of skill in the art the means and manner of reactant selection, procedures for utilizing the reactants, and the general nature of the polyamides to be obtained.

EXAMPLE I

A polyamide was produced by the following procedure. In a Waring blender 2.2 gm. of $\alpha,\alpha'$-dimethyl-trans,trans-muconyl chloride was dissolved in 50 ml. of carbon tetrachloride. Some of the acyl chloride was not soluble and the resulting solution was somewhat milky in appearance. To this solution was added 2.2 gm. of hexamethylenediamine dissolved in 25 ml. of H₂O. The two liquid phases were intimately contacted by operating the Waring blender at high speed for about 2 minutes. The product was a solid which was removed from the blender and washed twice with water, once with methanol, and dried at 60° C. for 1 hour in a vacuum oven to give 1.96 gm. of polymer. The capillary melting point was 293° C. Inherent viscosity ($\eta_{inh}$) was 0.40 (determined in a solution of 60% by weight of tetrachloroethylene/40% by weight phenol). A formic acid solution was filtered through a fritted glass filter funnel and the inherent viscosity determined as 0.60.

X-ray diffraction patterns established the presence of the polyamide. Crystallinity calculated from X-ray diffraction patterns is about 30% at 40° C.

EXAMPLE II

A solution of 2.7 gm. (.0147 M) of adipyl chloride and 0.34 gm. (.00164 M) of dimethyl-trans,trans-muconyl chloride in 100 ml. of carbon tetrachloride was poured into a Waring blender. To this solution was added with high speed stirring, a solution of 4.4 gm. of hexamethylene-diamine in 50 ml. of water. The blender was run at high speed for about 2 minutes. A white solid polyamide was recovered. The product was washed three times with a 50/50 solution of water/ethanol and once with methanol. The polyamide was dried for 1 hour in a vacuum oven at 100° C. to give 2.36 gm. of polyamide. Melting point of the polyamide was 239° C. Inherent viscosity ($\eta_{inh}$) was determined in formic acid to be 1.0.

The presence of polyamide was determined by X-ray diffraction patterns. About 10 mole percent of the diacid component of the polyamide was DMMA (dimethylmuconic acid).

EXAMPLE III

In a procedure similar to that of Example II, 1.5 gm. of adipyl chloride and 0.085 gm. α,α′-dimethyl-cis,cis-muconyl chloride were dissolved in 100 ml. of carbon tetrachloride in a Waring blender. To this solution was added 2.2 gm. of hexamethylene-diamine stirring at high speed in the blender for about 2 minutes. The polyamide product was washed with water, washed with methanol and dried in a vacuum oven for 1 hour at 70° C. The product was 1.22 gm. of polyamide containing about 5 mole percent DMMA in the diacid component and having a melting point of 245–247° C.

EXAMPLE IV

In the same procedure as Example III, 1.35 gm. of adipyl chloride and 0.17 gm. of α,α′-dimethyl-cis,cis-muconyl chloride (about 10 mole percent of the diacid component) were reacted with 2.2 gm. of hexamethylenediamine to produce 1.16 gm. of polyamide having a melting point of 242–243° C. Crosslinking occurs at about the melting point.

EXAMPLE V

In a Waring blender, 2.2 gm. of α,α′-dimethyl-cis,cis-muconyl chloride was dissolved in 100 ml. of carbon tetrachloride. To this solution was added, with high speed stirring, a solution of 2.2 gm. of hexamethylenediamine in 100 ml. of water. The high speed stirring was conducted for a total of 2 minutes. The solid polyamide product was washed once with water, once with methanol, and finally a 50/50 mixture of hexane/octane and dried for 1½ hours at 40° C. in a vacuum oven. Melting point of the polyamide was 220° C.

EXAMPLE VI

Seventeen grams of α,α′-dimethyl-cis,cis-muconic acid was dissolved in 350 ml. of refluxing ethanol. To this solution was added 16.95 gm. of 70% practical grade hexamethylenediamine, rapidly and with stirring. A milky precipitate appeared. The solution was allowed to cool and stand overnight. 27.9 gm. of a white crystalline 1:1 salt was recovered (98.5% of theoretical). The melting point of the salt was 174° C. 20 gm. of the salt was placed in a pressure polymerization tube which was evacuated and replaced with N₂ three times. The temperature of the tube was held at 160° C. for 30 minutes, then raised to 173–175° C. for 3 hours. Some moisture was given off during this time. The temperature was raised to 185° C. for 5½ hours after which a vacuum was pulled for 2½ hours. Final temperature and pressure was 195° C. and .065 mm. Hg. The product was a semisolid somewhat gelatinous mass.

EXAMPLE VII

This reaction shows a melt polymerization. In a 100 ml. pear shaped flask fitted with a nitrogen dip tube to the bottom and an air condenser 9.90 gm. of α,α′-dimethyl-trans,trans-dimethylmuconate and 5.81 gm. of hexamethylenediamine were heated on a 140–145° C. Woods metal bath for one hour under a stream of N₂. Some methanol was produced and refluxed then carried off by the N₂. 3 gm. of additional hexamethylenediamine was added and the temperature increased to 160° C. for one hour. Additional methanol evolved. The temperature was increased to 190° C. for 1¼ hours. Methanol evolution ceased. The temperature was increased to 210° C. on a magnetic hot plate with a magnetic stirrer for 1 hour. There was some additional refluxing. The temperature was held at 238–240° C. for 1 hour. The flask was evacuated for 3 hours at 200° C. The polyamide product was 22.43 gm. of amber resin. The polymer was dissolved in formic acid and filtered through a fritted glass filter and inherent viscosity ($\eta_{inh}$) determined to be 1.18.

Infrared spectrum showed all bands to coincide with characteristic absorptions of polyamides.

What is claimed is:

1. A solid linear polyamide consisting essentially of the condensation product of (A) an organic dibasic component selected from the group consisting of α,α′-dimethyl-cis,cis-muconic acid, α,α′-dimethyl-cis,trans-muconic acid, α,α′-dimethyl-trans,trans-muconic acid, mixtures thereof with each other and with a saturated organic diacid of the structure

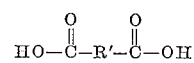

the diesters thereof and the diacyl chlorides thereof wherein R′ is an alkylene radical and (B) an organic diamine of the structure HN—R″—NH₂ wherein R″ is an alkylene radical.

2. A linear polyamide according to claim 1 wherein R′ has 1 to 20 carbon atoms.
3. A linear polyamide according to claim 1 wherein R″ has 2 to 20 carbon atoms.
4. A linear polyamide according to claim 3 wherein R″ has 2 to 12 carbon atoms.
5. A linear polyamide according to claim 3 wherein the diacid component is selected from the group consisting of α,α′-dimethyl-cis,cis-muconic acid, α,α′-dimethyl-cis, trans-muconic acid, α,α′-dimethyl-trans,trans-muconic acid and mixtures thereof.
6. A linear polyamide according to claim 5 wherein the organic diamine is hexamethylenediamine.
7. A linear polyamide according to claim 4 wherein the saturated organic diacid is selected from the group consisting of oxalic, adipic, pimelic, suberic, azelaic, malonic and glutaric acid.
8. A linear polyamide according to claim 7 wherein the mole ratio of the α,α′-dimethylmuconic acid portion of the organic diacid component to saturated organic diacid portion is in the range of 1:100 to 100:1.

9. A linear polyamide according to claim 8 wherein the ratio is in the range of 1:20 to 20:1.

10. A linear polyamide according to claim 8 wherein the organic diacid component is α,α'-dimethyl-cis,cis-muconic acid and adipic acid.

11. A linear polyamide according to claim 8 wherein the organic diacid component is α,α'-dimethyl-trans,trans-muconic acid and adipic acid.

12. A linear polyamide according to claim 8 wherein the organic diamine is hexamethylenediamine.

References Cited

UNITED STATES PATENTS 2,174,619  10/1939  Carothers _____ 260—78

HAROLD D. ANDERSON, Primary Examiner

U.S. Cl. X.R.

152—330; 260—3, 31.2, 32.8, 33.4, 47, 857; 264—178